Nov. 1, 1966  P. B. MASON  3,281,956
APPARATUS FOR FREEZE DRYING
Filed Nov. 23, 1964  7 Sheets-Sheet 1
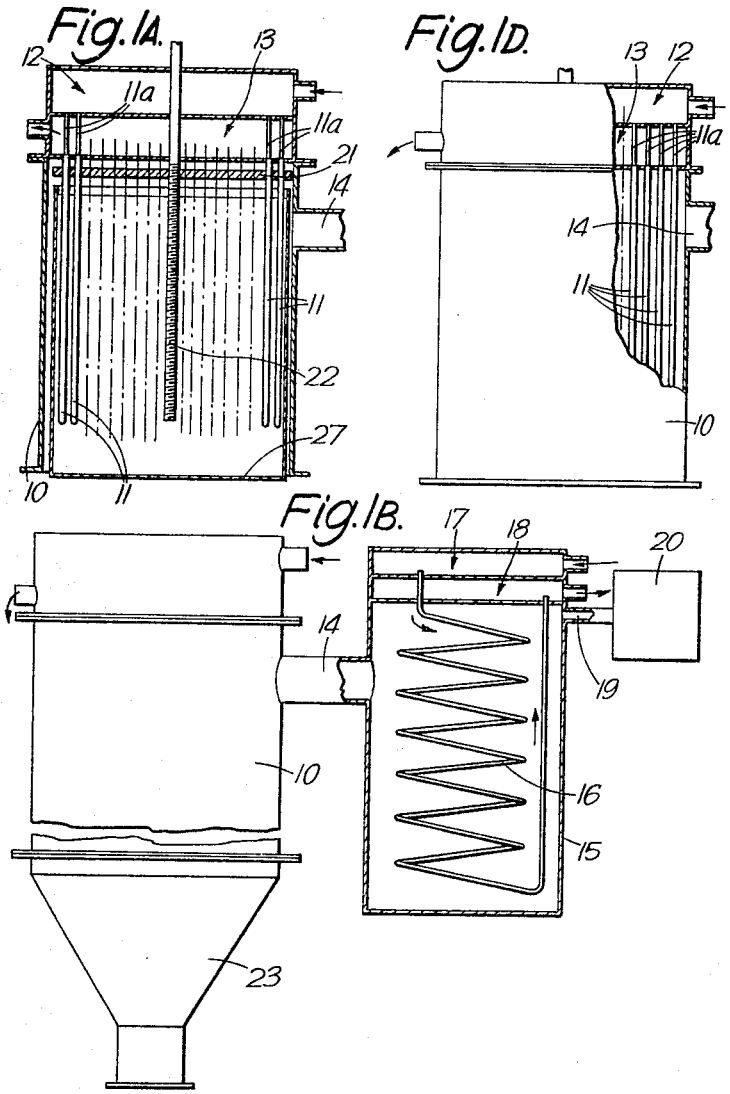
INVENTOR
Peter B. Mason
By Watson, Cole, Grindle & Watson
ATTORNEYS Nov. 1, 1966 P. B. MASON 3,281,956
APPARATUS FOR FREEZE DRYING
Filed Nov. 23, 1964 7 Sheets-Sheet 2
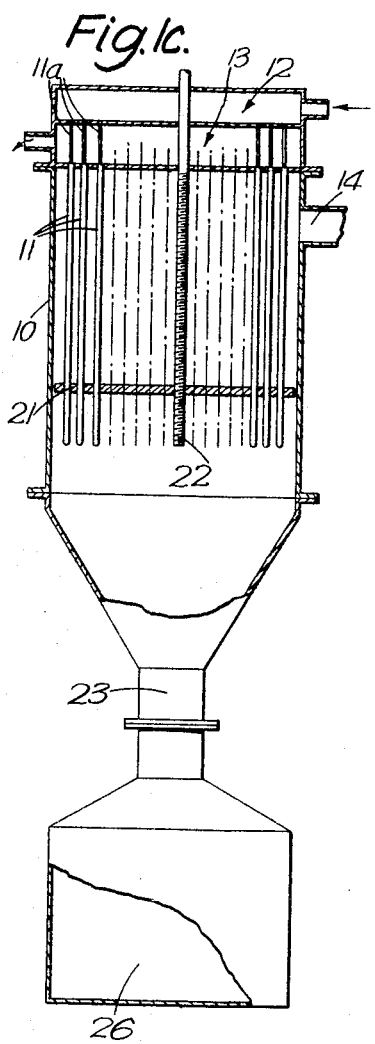
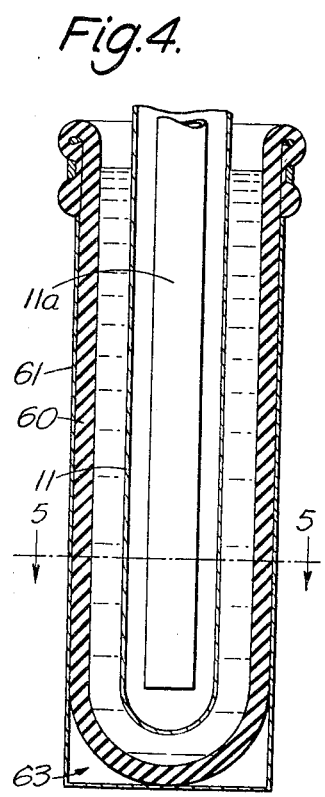
INVENTOR
Peter B. Mason
By Watson, Cole, Grindle & Watson
ATTORNEYS Nov. 1, 1966 P. B. MASON 3,281,956
APPARATUS FOR FREEZE DRYING
Filed Nov. 23, 1964 7 Sheets-Sheet 3
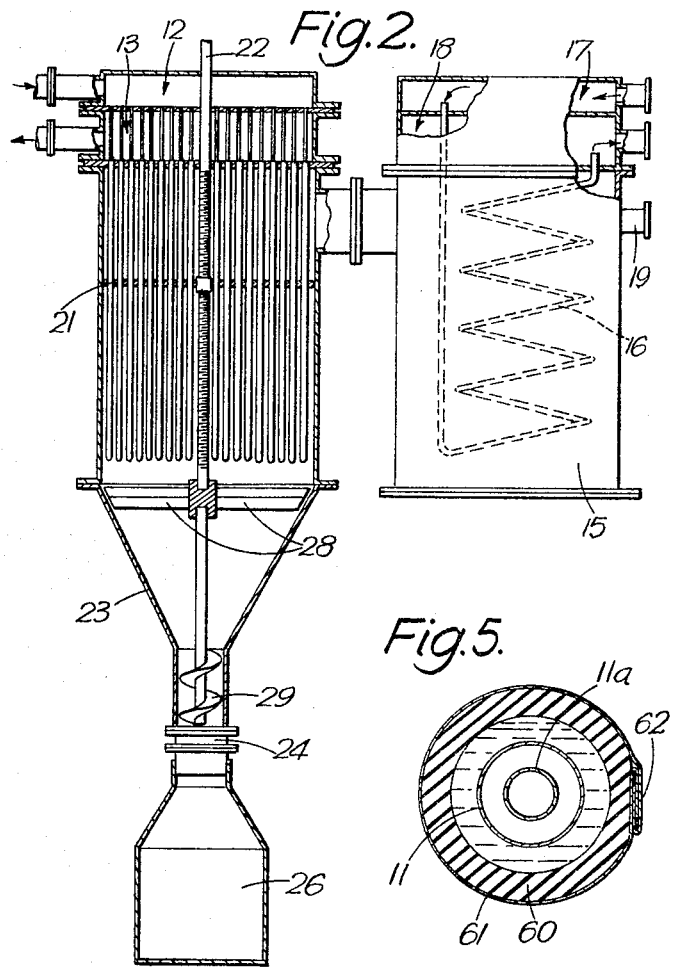
INVENTOR
Peter B. Mason
By Watson, Cole, Grindle & Watson
ATTORNEYS

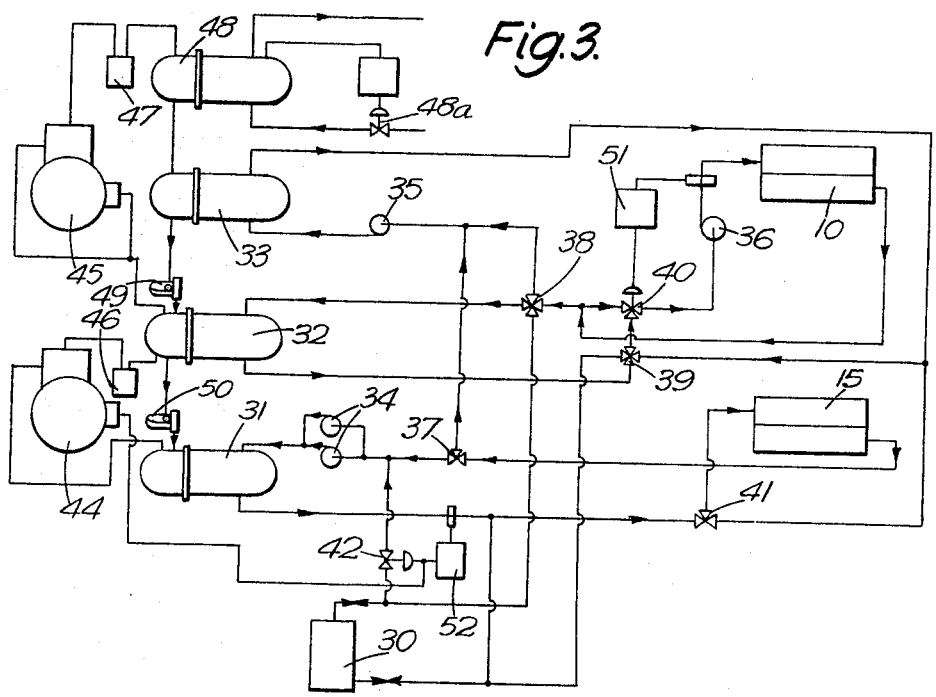

Nov. 1, 1966   P. B. MASON   3,281,956
APPARATUS FOR FREEZE DRYING
Filed Nov. 23, 1964   7 Sheets-Sheet 5
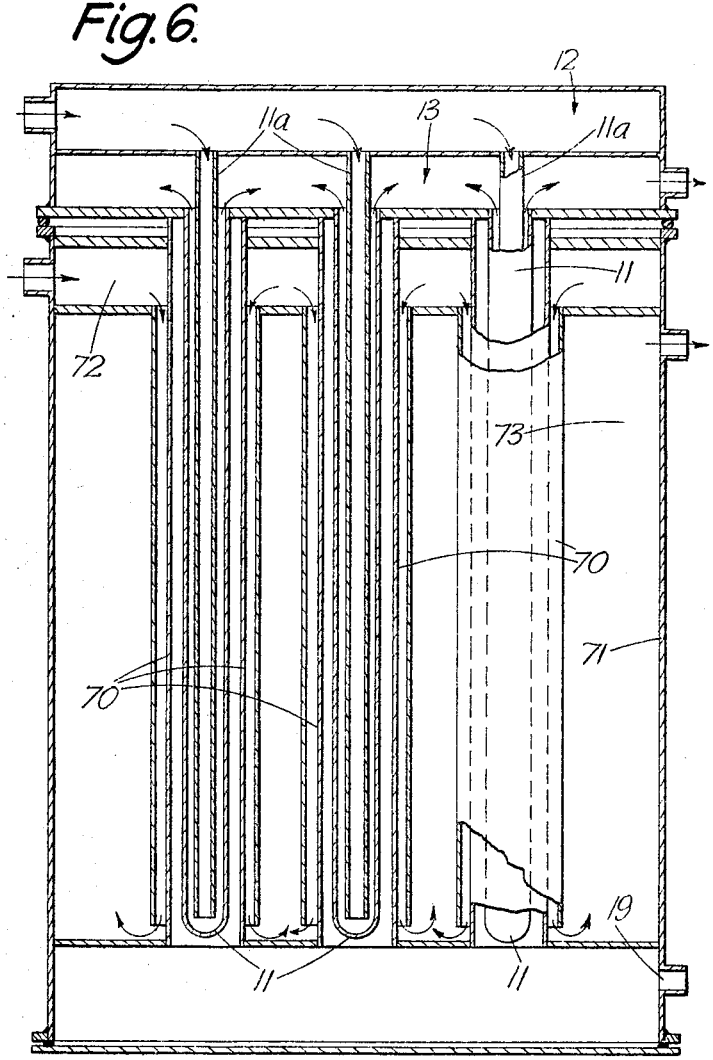

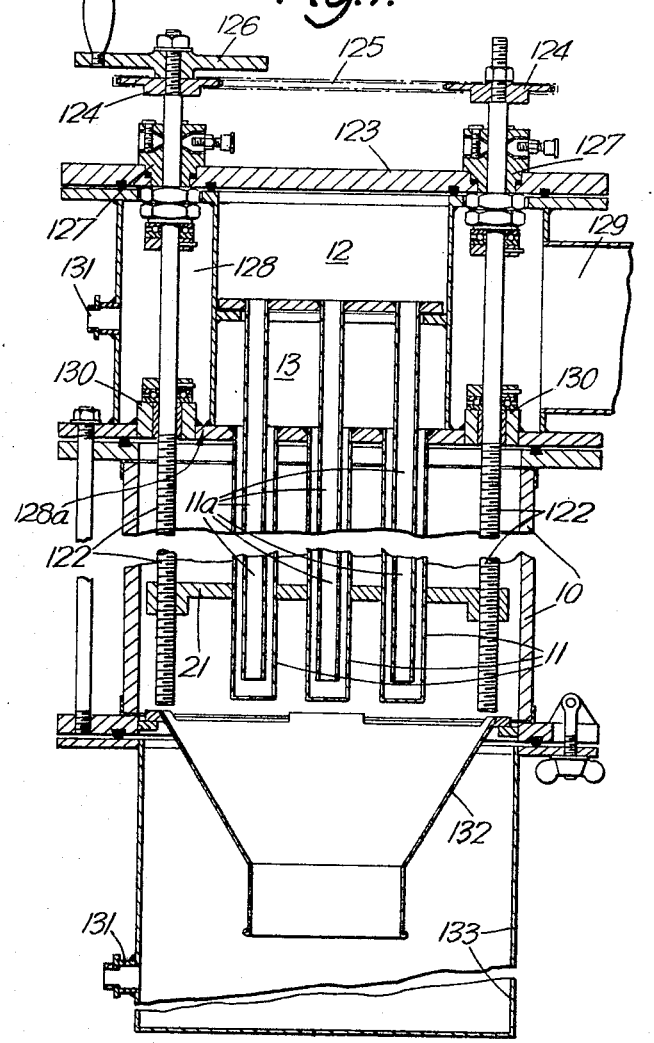

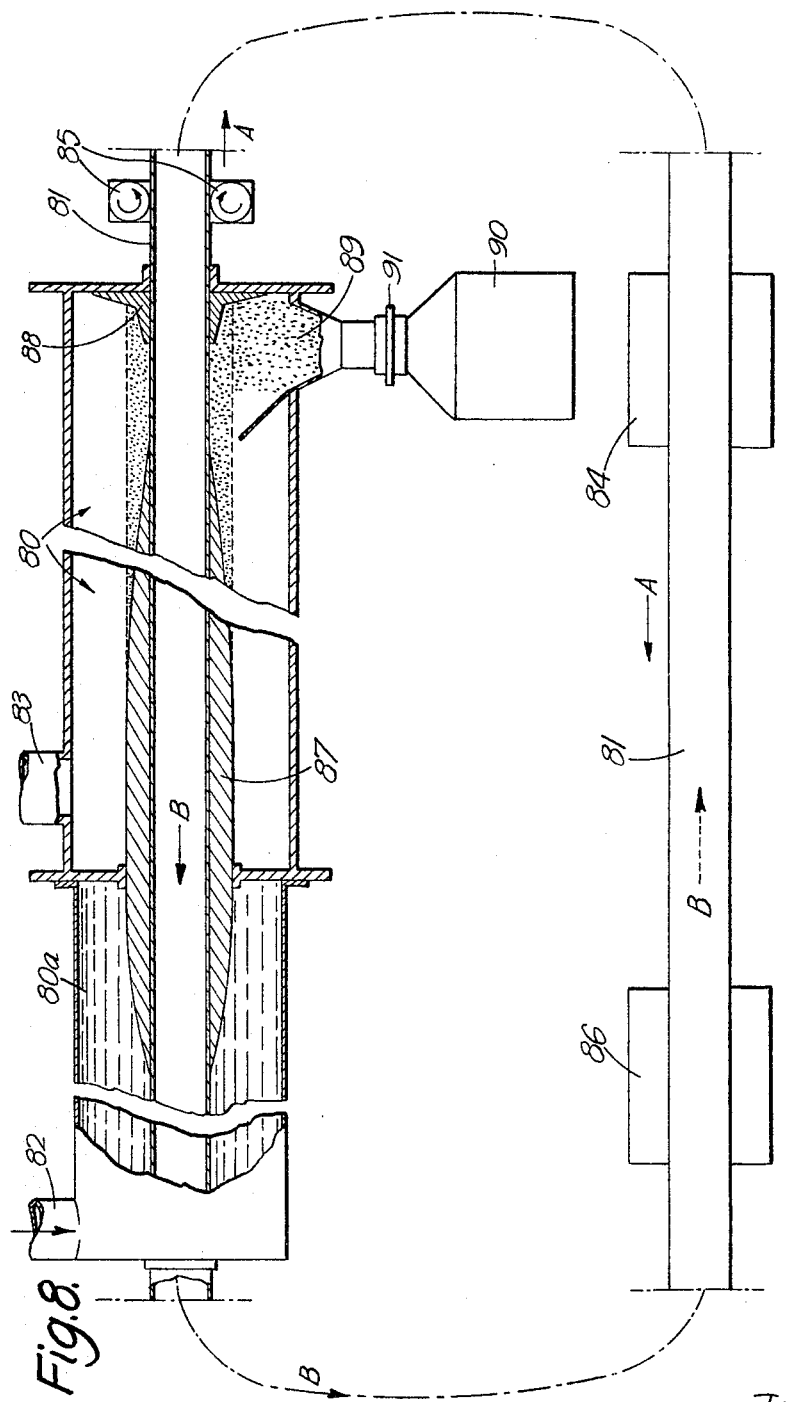

United States Patent Office 3,281,956
Patented Nov. 1, 1966

3,281,956
APPARATUS FOR FREEZE DRYING
Peter Barry Mason, London, England, assignor to Mitchell Engineering Limited, London, England, a British company
Filed Nov. 23, 1964, Ser. No. 413,151
Claims priority, application Great Britain, Nov. 22, 1963, 46,271/63
13 Claims. (Cl. 34—92)

This invention comprises improvements in or relating to freeze drying methods and apparatus suitable for the treatment of liquid solutions, emulsions, suspensions of solids in liquids, slurries and the like. For convenience such will be called the "fluid to be dried."

According to this invention, in freeze drying the fluid to be dried is frozen in a layer of predetermined thickness on to the external surface of a structure having an internal passage by passing a refrigerant through the passage and then subjecting the frozen matter to such conditions of reduced pressure that sublimation of at least one constituent of the frozen matter occurs, whilst supplying heat to the frozen matter by the maintenance of a flow of refrigerant through the passage at a refrigerant temperature controlled to be below the fusion point of the frozen matter at least until substantial drying has occurred. Until drying has proceeded to a substantial extent, the refrigerant temperature although below the fusion point is controlled to provide heat to compensate for the sublimation effect.

Preferably, final drying out is effected by passing refrigerant at a temperature above the fusion point through the passage.

The structure is conveniently in the form of a tube through which the refrigerant flows and on the outer surface of which the fluid to be dried is frozen into a layer.

A number of advantages may be derived from use of the invention.

For instance, since the controlled temperature refrigerant is caused to flow throughout the treatment, there is no tendency for the frozen matter to melt as may occur in known freeze drying processes in which the temperature of the frozen material to be dried may rise above its fusion point before the pressure in the drawing chamber has been reduced to a low value.

Nevertheless in the present invention, during the sublimation step, the refrigerant, which is preferably the same as that used for the freezing step, acts to supply heat to the frozen matter for effecting sublimation, which heat according to an important feature of this invention may be obtained by using the refrigerant, which is leaving the structure, for cooling purposes at another point, for instance for cooling a fluid leaving a refrigerant compressor.

Another advantage of maintaining the flow of refrigerant through internal passages during both the freezing and the sublimation steps is that there is no tendency for the frozen matter to separate from the structure and so lose contact with the surface from which it gains the heat required for sublimation.

Another advantage is that the energy required to effect freeze drying may be substantially reduced, since the energy for the sublimation step is a byproduct of the refrigeration plant.

Another advantage is that by maintaining the refrigerant flow throughout the process, it is no longer necessary to ensure rapid reduction of the pressure at the start of the sublimation stage in order to avoid melting of the frozen matter.

The predetermined thickness of the fluid to be dried is frozen on to the outside of the structure say externally on tubes by presenting the fluid to the tubes in a mould or a tank or the like and passing a refrigerant through the tubes. The thickness depends on the size of the tube and good results are obtained if, for instance, the ratio of the outside diameter of the frozen on layer to the outside diameter of the tube is about 1.5:1 for tubes of about 1 inch outside diameter an ice thickness of up to ¼ inch is thus suitable for 1 inch tubes.

This invention also comprises apparatus for carrying out the above method, comprising a structure having internal passages and whereon the fluid to be dried is frozen, means to supply refrigerant to said passages, a vapour condenser, chamber-defining means in which the structure and said vapour condenser are enclosed during drying, means for producing a vacuum in said chamber-defining means when closed and means controlling the temperature of the refrigerant flowing in the passages to effect freezing of the fluid and, until substantial drying has been effected, to supply heat for sublimation but nevertheless to maintain the temperature of the frozen matter below its fusion point. Preferably the structure comprises tubes through which refrigerant is passed.

In one arrangement the structure having the internal passages and the vapour condenser are in separate chambers, both of which are evacuated during drying, and in another arrangement using tubes to form said structure, the tubes and the vapour condenser means are interspersed in a common chamber.

Some forms of apparatus for carrying out the invention will now be described with reference to the accompanying drawings, in which—

FIGURES 1A, 1B, 1C and 1D illustrate successive steps using the apparatus,

FIGURE 2 shows the apparatus to a larger scale and in more detail,

FIGURE 3 shows a basic flow circuit,

FIGURE 4 shows another means for securing a uniform ice layer,

FIGURE 5 is a section on the line 5—5 of FIGURE 4,

FIGURE 6 shows an alternative form of the apparatus,

FIGURE 7 shows another form of the apparatus, and

FIGURE 8 shows diagrammatically yet another form of the apparatus.

The apparatus shown in FIGURES 1A to 1D and 2 comprises a drying chamber 10 having in it a plurality of downwardly extending structures 11 on which the fluid to be dried is frozen and then subsequently sublimated.

The structures 11 are tubes closed at their lower ends and each have extending within it an inner tube 11a leading from a refrigerant inlet header 12 to the lower ends of the structures 11. The upper ends of the tube structures 11 open into a refrigerant outlet header 13.

The drying chamber 10 is connected by a duct 14 to a condenser chamber 15 containing a vapour condenser 16 leading from a refrigerant inlet header 17 to an outlet header 18. The vapour condenser 16 may be of any convenient construction and for instance may be a tube structure like the structure 11, or may be a coil. The chamber 15 is connected by duct 19 to a vacuum pump 20.

A scraper 21 is mounted on a central threaded rotating shaft 22 and on rotation of the shaft the scraper 21 which is in the form of a perforated plate through which the tube structures 11 extend, travels up or down according to the direction of rotation of the shaft.

The drying chamber 10 has an associated removable bottom closure 23 which has at its lower end a sealing valve structure 24 of any conventional kind through which dried material can be discharged into containers 26.

In use the fluid to be dried is first frozen to a predetermined thickness, so that for instance for 1 inch diameter tubes the thickness of the frozen layer is up to ¼ inch. This is done for instance by immersing the tubes 11 in a tank 27 of the fluid (FIGURE 1A) and by passing a refrigerant through the structures from the inlet header 12 down the tubes 11a and up to the tubes 11 to the outlet header 13. The wall of the drying chamber 10 may be detached from the headers 12, 13 during this step. The scraper 21 is at the top of the tube structure 11. The tank 27 is now removed.

The closure 23 is now fitted (FIGURE 1B) and, whilst still passing a refrigerant through the tube structures to keep the fluid frozen, the pressure within the chamber 10 is reduced to say 0.1 mm. Hg by means of the vacuum pump. Since the material is kept in the frozen state, there is no need that this step be effected rapidly.

Sublimation of the frozen material now commences and the vapour so produced passes into the condenser chamber 15 and is condensed on the vapour condenser 16 through which refrigerant is being passed. The heat required for sublimation is derived from the refrigerant passing through the internal passages of the structures 11. This refrigerant is clearly cooled during this step and refrigerant leaving the header 13 may be employed directly or indirectly for effecting condensation of the vapour on the vapour condenser 16.

After an appropriate drying time, the dried matter is removed from the structures 11 by traversing the scraper plate 21 downwardly along them by rotating shaft 22 (FIGURE 1C). This may be done either after bringing the pressure in chamber 10 back to atmospheric pressure, or whilst the vacuum is maintained in which case the material is discharged through the valve 24 (FIGURE 2).

If desired (FIGURE 2) the shaft 22 may carry beaters 28 to break up the material and a screw conveyor 29 to assist discharge.

The receivers 26 may in this case be sealed and contain a chemically inactive atmosphere for instance of nitrogen.

The bottom closure 23 is now removed (FIGURE 1D), the apparatus may be cleaned before the cycle is repeated.

Referring now to FIGURE 3, there is shown diagrammatically a typical circuit arrangement for the refrigerant.

In this figure, the drying cabinet 10 and vapour condenser chamber 15 are fed with brine for cooling and heating purposes.

The refrigerant brine flows in a circuit which comprises a cold brine tank 30, a brine cooler 31 and two brine heaters 32, 33, each of which is of the shell and tube type in which the brine is in heat exchange with a primary gas refrigerant. The secondary circuit also compises pumps 34, 35, 36, multiway valves 37–41, and a automatically controlled throttle valve 42. The multiway valve 40 also incorporates a throttle.

The gas circuit, for the primary heat transfer medium (which is a gas) comprises a low pressure compressor 44 delivering, through an oil separator 46 and heater 32 for the secondary heat transfer medium (which is brine), to a high pressure compressor 45, from which the compressed primary heat transfer medium passes through an oil separator 47 and a water cooled condenser 48 of the shell and tube type passes to the brine heaters 33, 32 and cooler 31 in series. The supply of coolant water to the condenser 48 is controlled by a temperature controlled throttle valve 48a. There are expansion valves 49, 50 respectively between the heaters 33, 32 and between heater 32 and cooler 31. The temperature of the primary heat transfer medium decreases as it flows from the condenser 48 to the cooler 31.

Heat exchanger 48 is a water cooled condenser for removing heat from, and therefore liquefying, the hot primary heat transfer medium leaving the compressor 45. The warm liquid primary heat transfer medium leaving 48 passes through a heat exchanger 33 which acts as a brine (secondary heat transfer medium) heater for final drying in chamber 10.

Thus, the primary heat transfer medium is cooled further and passes through the float valve 49 where it is expanded into the intermediate heat exchanger 32. Heat exchanger 32 acts as an evaporator for the primary heat transfer medium in circuit 45, 47, 48, 33, 49, 32, 45, as a condenser for primary heat transfer medium in circuit 44, 46, 32, 50, 31, and as a brine heater for effecting sublimation in drying chamber 10.

The primary heat transfer medium, flowing as a cold liquid from 32, is expanded into heat exchanger 31 through float valve 50. Thus, the heat exchanger 31 acts as an evaporator for primary refrigerant in circuit 44, 46, 32, 50, 31, 44, and as a brine cooler for secondary heat transfer medium which is flowing through vapor condenser 15.

The operation of the two heat-transfer-medium-circuit results first in the freezing of the materials by a portion of the secondary heat transfer medium (i.e., brine) which is fed from the brine tank 30 to the tubular elements in the drying chamber 10, whereafter the frozen material is sublimated in that chamber by another portion of the secondary heat transfer medium which has had its temperature raised and then passed through said tubular elements. The condensation of the vapor resulting from the sublimation takes place in the condenser chamber 15 thereby heating the secondary heat transfer medium (i.e., the brine) which is passing through the coils of the condenser. The heat thus transferred to the brine is given up to the gaseous primary heat transfer medium in the brine cooler 31. Compression of the heated gaseous primary heat transfer medium to raise its temperature takes place in the low pressure compressor 44, whence it passes to the brine heater 32 where it gives up heat to another portion of the aforesaid secondary heat transfer medium (i.e., the brine). The resulting heated portion of the secondary heat transfer medium causes further sublimation in the drying chamber 10, and so on.

The cooled primary gaseous heat transfer medium is passed through a further compression stage in a high pressure compressor 45 to raise its temperature and passes thence to an oil separator 47 and to a condenser 48 where it is condensed and finally to a brine heater 33 where it heats a further portion of the secondary heat transfer medium (i.e, brine) which is used for the final drying out of the material being treated in the drying chamber 10.

As previously indicated the flow of both portions of the secondary heat transfer medium is effected by pumps 34, 35, 36 and is controlled by valves 37–42.

The operation may be summed up as follows:

During the freezing step, cold brine at −25° to −40° F. is circulated as follows:

(1) from the tank 30 through valve 39, throttle 40 pump 36 and the structures, such as 11, in the drying cabinet 10 and then back to the tank 30, and (2) from the cooler 31 through valve 41, the vapour condenser 16 in chamber 15, valve 37, pumps 34 back to the cooler 31.

When the freezing is complete and after closure of the cabinet 10 and reduction of the pressure therein, the valves 38 and 39 are closed so as to stop the freezing step and to initiate the drying step.

During the major part of the drying step:

(1) valves 38 and 39 are set so that brine at about 25° F. or below can flow from the heater 32, through valve 39, throttle valve 40 which controls the brine temperature by means of the present temperature controller 51, pump 36, the structure covered with frozen material in the cabinet 10, and thence back to the brine heater 32, (2) the vapour condenser 15 remains connected to the cooler 31.

During the final portion of the drying step:

(1) the valves 39 are set to allow brine at up to about 86° F. to flow through to valve 40 and thus to the structure such as 11 in the cabinet 10, (2) under these conditions, the valve 42 is opened by the temperature controller 52 so allowing some of the cold brine from the cooler 31 to be bypassed from the condenser 15 to flow through the cold brine tank 30 to recool the brine therein. This is possible because only small amounts of vapour are reaching condenser 15 which is therefore operating at low load.

During removal of the product, the vapour condenser 15 is defrosted by adjusting valves 41 and 37 so that brine from heater 33 can be circulated through the condenser coil by pump 35.

Various modifications are possible. Thus instead of using a tank 27 to present the fluid to be dried to the tubular structure 11, moulds such as are shown in FIGURES 4 and 5 may be used, one per member 11. Each mould consists of a rubber or other elastomeric sleeve 60 which has a clearance from the tube 11 equal to the desired thickness of frozen material and a container 61 of sheet metal or other resilient material housing the sleeve 60. The container has an expansion joint 62 to accommodate expansion as the fluid freezes. Once the fluid in the mould is completely frozen, the mould can be drawn off the tube 11. By arranging that a partial vacuum forms in the space 63 during drawing off, it is possible to ensure that, once clear of the frozen material, the sleeve returns to the position shown ready for reuse.

In another form of plant (FIGURE 6), the tubular structures 11, 11a and the vapour condenser means 70 are interspersed in the same chamber 71, so that the water vapour travels only a short distance from the matter being dried to the condenser means. The inlet header for the condenser refrigerant is indicated at 72 and the outer header at 73.

FIGURE 7 shows in cross-section a simple form of apparatus suitable for test purposes and in it the same references are used as in FIGURES 1A to 2 to indicate like parts.

In this construction, the scraper 21 is mounted on a number of threaded rods 122 which are rotatably mounted in a removable top closure plate 123. Each rod carries a chain wheel 124, these wheels being coupled by chain 125, and one rod carries an operating handle 126. Thereby the rods can be rotated simultaneously. The rods pass through rotary vacuum seals 127 into a vacuum header structure 128, then into the drying chamber 10 through suitable bearings 130. The structure 128 has a connection 129 leading to a vapour condenser and a vacuum pump and is also in communication with the drying chamber through slots in plate 128a. Gas supply connections 131 are provided to allow the apparatus to be flushed with nitrogen or other suitable gas. The refrigerant headers 12, 13 are disposed centrally of the vacuum header 128 which is open to the drying chamber.

The dried material is collected in a removable hopper 132 which is supported on the lower end of the drying chamber 10 and is covered by removable bottom cover 133 which also has a gas supply connection 131.

In yet another form, FIGURE 8, the apparatus is designed for continuous operation. The apparatus comprises an elongated drying chamber 80 through which a closed loop tubular element 81 is fed in the direction of arrow A as by an extractor mechanism 85. Beyond the end of the elongated drying chamber 80 at which the tubular element 81 enters, there is an inlet 82 to a liquid space 80a for the fluid to be dried, and at a position spaced from this inlet is a connection 83 to a side chamber which has a connection to a vacuum pump and houses a vapour condenser (not shown). A suitable form of pump 84, e.g., an impulse pump, is provided to cause a refrigerant to flow in the tubular element 81 in the direction of arrows B, that is in a direction opposite to the travel of the tubular element 81. Also externally of the chambers there is a refrigerant heater 86 which may act to cool a primary refrigerant flowing for the vapour condenser circuit (not shown). There may be a heating jacket around the drying chamber 80.

The fluid freezes onto the moving tubular element 81 until the ice effectively fills the cross-section and the rod of ice 87 thus formed moves into the vacuum space 80 where the ice is internally heated by the refrigerant fluid. Thereby the volatile constituent is sublimated. It can be shown that the refrigerant may have a temperature of 140° F. at the entry to the portion of the tubular element 81 in the drying chamber and that due to the heat absorbed during sublimation the temperature will fall to about −4° F., and the temperature will rise again to about 14° F. at the fluid inlet.

The ice 87 also forms an effective seal between liquid space 80a, wherein the liquid is part chilled and then frozen, and the space 80 wherein sublimation occurs.

The dried material is scraped from the element 80 by a device 88 forming part of an outlet seal, and falls into a hopper 89, from which the material can be charged into a container 90 through a rotary vacuum seal 91.

When the inner liquid is at its maximum temperature it imparts its heat to the driest portion of the products and suffers a drop in temperature as it passes to the colder end of the product. Eventually at the point of the liquid/ice vacuum seal, the inner liquid passes through a zone where sublimation from the product is maximum, assisted by surface evaporation. In this zone the temperature of the inner liquid falls below zero and becomes a freezing medium for the liquid product. It leaves this zone at a temperature close to zero and then goes on to remove heat from the liquid heating bath and hence cools the refrigeration condenser.

The structure on which the fluid is frozen and dried may, instead of being tubular, be of any form so arranged as to include passages for the refrigerant.

I claim:

1. A freeze drying apparatus for liquid materials comprising
   (a) a closed chamber for receiving said liquid material to be dried
   (b) at least one pipe extending into said chamber
   (c) means for generating a flow of refrigerating medium through said pipe
   (d) means for bringing said pipe clear of the liquid with portions of the liquid frozen around it
   (e) means for subjecting the pipe with material frozen around it to vacuum so as to effect sublimation
   (f) a scraper encircling the pipe
   (g) means for effecting relative movement between said pipe and scraper in the direction of the length of the pipe whereby the dried material is scraped off the outside of said pipe.

2. A freeze drying apparatus according to claim 1 wherein said closed chamber comprises
   (a) an outer casing having said pipe fixed in relation thereto, and
   (b) an inner container for the liquid material to be dried and withdrawable from the outer casing leaving said pipe clear of the liquid.

3. A freeze drying apparatus according to claim 2 and comprising
   (a) vacuum chamber communicating with the outer casing and
   (b) means for generating a vacuum in said chamber and casing.

4. A freeze drying apparatus according to claim 2 wherein said withdrawable inner container is replaceable by a closure structure for collecting the dried material scraped off said pipe.

5. A freeze drying apparatus according to claim 2 and comprising (a) a rotatable lead screw fixed against axial movement in relation to said outer casing
(b) a scraper in screw threaded engagement with said lead screw and constrained against rotational movement.

6. A freeze drying apparatus according to claim 2 and in which there are provided
(a) a number of said pipes
(b) each said pipe being closed at one end and at the other communicating with
(c) an outlet header supported by the outer casing
(d) a supply pipe for refrigerating medium extending into each of the first said pipes and connected outside that pipe to
(e) an inlet header
(f) a scraper plate having holes through which the first said pipes extend and
(g) means for imparting movement to the scraper plate along the first said pipes.

7. A freeze drying apparatus according to claim 1 wherein said closed chamber comprises
(a) an outer casing and
(b) an expansible mould withdrawable from said chamber and into which said pipe projects.

8. A freeze drying apparatus according to claim 1 wherein said pipe is an endless flexible pipe extending in a liquid tight manner through said chamber and said encircling scraper and containing said refrigerating medium and means are provided for imparting movement to the pipe through said chamber.

9. A freeze drying apparatus according to claim 8 wherein said chamber is formed in two compartments through both of which said endless pipe travels and wherein means are provided for supplying the liquid to be dried to the compartment through which the endless pipe first travels and wherein the second compartment contains said scraper and communicates with means for generating a vacuum and with a closure for collecting the dried material scraped off the pipe.

10. A freeze drying apparatus according to claim 8 wherein there are provided outside said chamber
(a) a pump for operating upon said flexible pipe and
(b) means for heating the refrigerant within the flexible pipe.

11. A freeze drying apparatus according to claim 1 wherein there are provided
(a) a number of said pipes
(b) each of said pipes being closed at one end and communicating at the other end with
(c) an outlet header supported by said chamber
(d) a supply pipe for refrigerating medium extending into each of the first said pipes and connected outside that pipe to
(e) an inlet header and which closed chamber comprises
(f) an outer casing supporting the headers
(g) an inner container for the liquid to be dried and withdrawable from the outer casing leaving said pipe clear of liquid and replaceable by
(h) a second chamber having
(i) a header which communicates
(j) with further pipes into which the first said pipes extend when said replacement is effected and communicating with a source of vacuum.

12. A freeze drying apparatus according to claim 11 wherein said further pipes are encircled by outermost pipes connected at one end with a header for condenser refrigerant carried by each second chamber and which outermost pipes communicate at their other ends to the interior of the second chamber which latter is provided with an outlet for the condenser refrigerant.

13. A freeze drying apparatus according to claim 1 and comprising
a gas refrigerant primary circuit in which the refrigerant is cooled in a plurality of stages and finally effects cooling of a liquid refrigerant in a secondary refrigerant circuit supplying said liquid refrigerant to said pipes,
means conveying the refrigerant leaving said pipes to heaters therefor in which heat is absorbed and temperature controlleed actuating throttle means to control the refrigerant temperature at least during sublimation.

References Cited by the Examiner

UNITED STATES PATENTS

| | | | |
|---|---|---|---|
| 1,738,275 | 12/1929 | Baker | 34—5 |
| 2,406,682 | 8/1946 | Hayes | 34—5 |
| 2,853,796 | 9/1958 | Sanders | 34—5 |
| 2,885,788 | 5/1959 | Leviton | 34—5 |
| 3,088,222 | 5/1963 | Mace | 34—5 |

FOREIGN PATENTS 552,821    4/1943    Great Britain.

WILLIAM J. WYE, *Primary Examiner.*